United States Patent [19]
Sheets

[11] 3,922,085
[45] Nov. 25, 1975

[54] ILLUMINATOR FOR MICROPHOTOGRAPHY

[75] Inventor: Ronald E. Sheets, Westminster, Calif.

[73] Assignee: Tamarack Scientific Co. Inc., Orange, Calif.

[22] Filed: Aug. 22, 1974

[21] Appl. No.: 499,655

[52] U.S. Cl............ 355/71; 240/41.3; 240/41.35 R; 240/103 R; 353/98
[51] Int. Cl.² .......................................... G03B 27/76
[58] Field of Search 355/67, 71; 240/41.3, 41.35 R, 240/41.37, 103 R; 353/98

[56] References Cited
UNITED STATES PATENTS
3,536,403  10/1970  Strickholm.................... 355/67 X FOREIGN PATENTS OR APPLICATIONS
830,954  3/1960  United Kingdom................. 355/67

*Primary Examiner*—Richard A. Wintercorn
*Attorney, Agent, or Firm*—Forrest J. Lilly

[57] ABSTRACT

The disclosure is of a system of microphotography by which photographic transparencies of a scale of the order of 2.5 inches square may be optically projection printed at a reduced scale, e.g., at 10 to 1 reduction, onto a sensitized surface. The system has a present application to production by photoengraving techniques of electronic circuits of the order of 0.25 inch × 0.25 inch, with attainment of improved uniformity of circuit lines throughout. The system includes an arc source, collector, and a double matrix lenticular light integrator for uniform illumination of the transparency, and a 1 to 1 light projection system including an arc-illuminated aperture, and a relay lens for forming an image thereof inside the entrance pupil of the final reduction projection, with the circuit transparency located just beyond the relay lens, where it is very uniformly illuminated. A neutral density (non-color selective) filter has a radial transmission characteristic, and produces extraordinary uniformity in the final printing image.

7 Claims, 4 Drawing Figures

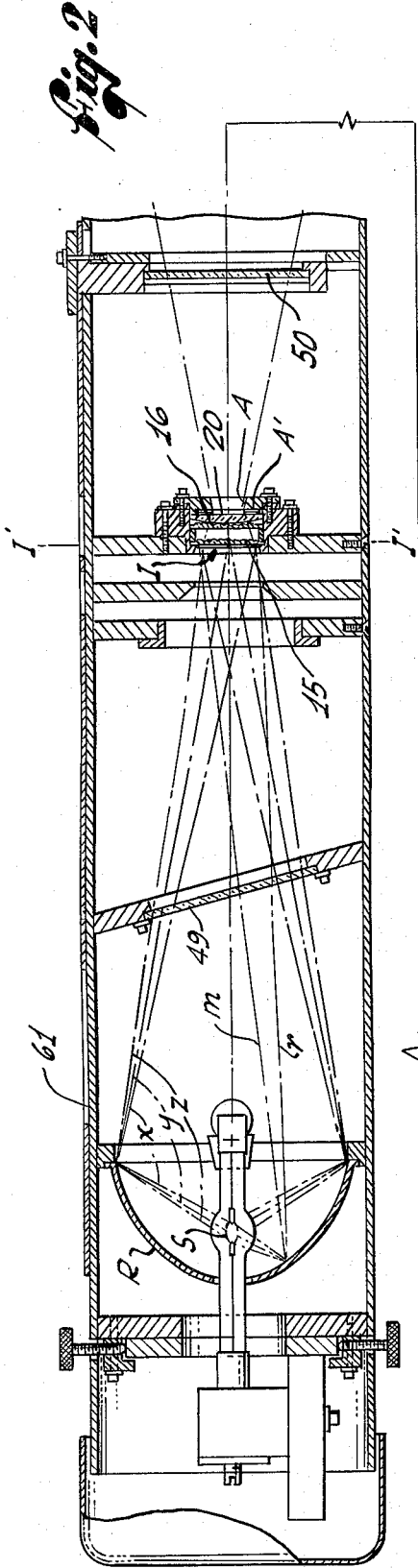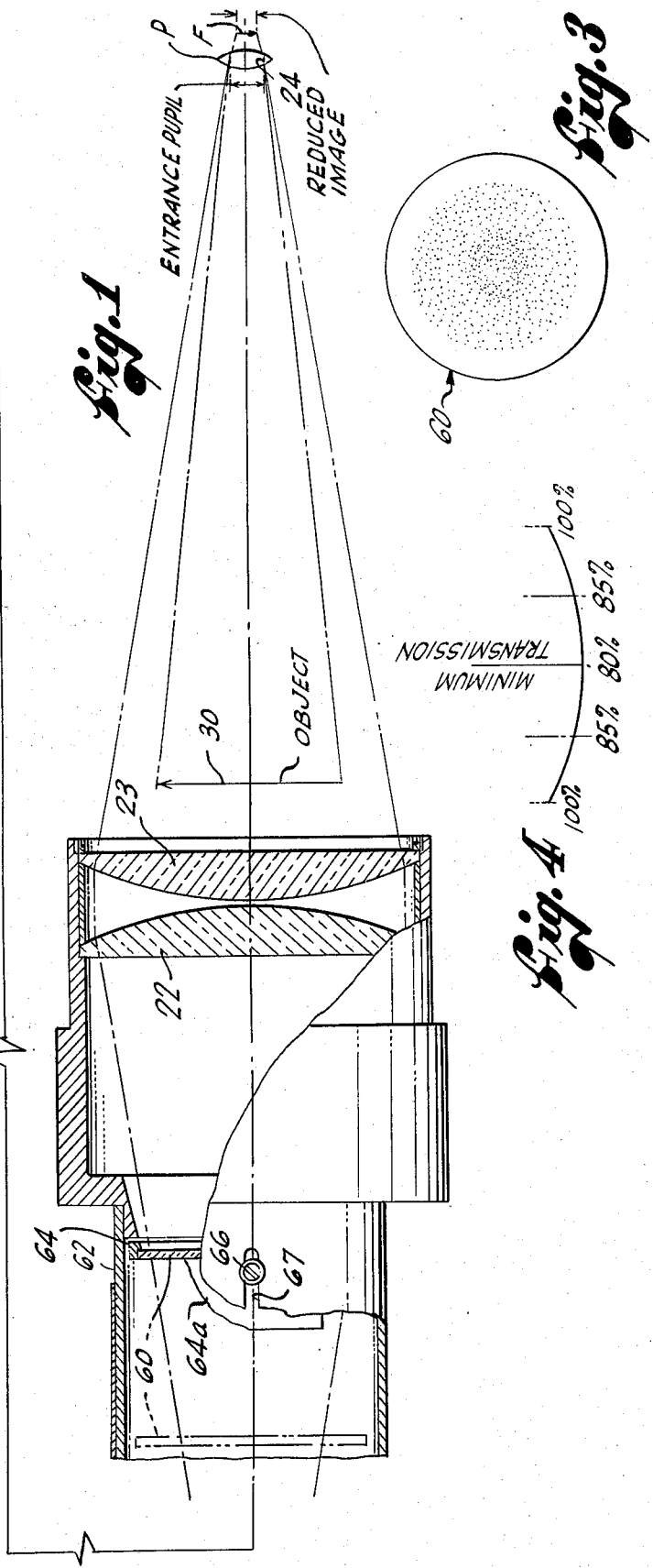

ILLUMINATOR FOR MICROPHOTOGRAPHY

FIELD OF THE INVENTION

This invention relates generally to microphotography, and more particularly to projection printing of an electric circuit depicted on a photographic plate onto a photosensitive surface at a reduction ratio which may range, for different cases, from 25 to 1 to the limit 1 to 1, but being ordinarily, in its present application, 10 to 1. Thereby, in the practice illustrative of the invention, a circuit on a photographic glass plate of dimensions of 2½ inches × 2½ inches may, for example, be reduced at a 10 to 1 ratio to dimensions of 0.25 inch × 0.25 inch, and thus may be printed a multiplicity of times at close spacing over the photosensitive surface of a substrate on an X-Y table, as well known in the art.

Desiderata in this art include importantly uniform density and sharpness in the final circuit image on the printing plate, and a purpose of the invention is improvement in these features.

BRIEF SUMMARY OF THE INVENTION

The system of the invention uses, typically, a 2½ inches × 2½ inches photographic transparency, either a positive or a negative, preferably on a glass sheet backing plate. This transparency is very uniformly illuminated by an optical illuminator, employing an optical integrator of a known double lenticular plate type, such as disclosed in my co-pending application Ser. No. 484,564, filed July 1, 1974. The optical integrator is illuminated by a preferably elliptical reflector, at one of whose conjugate foci is located a mercury arc light source. Light from the lenticules of the opical integrator is refracted by a one-to-one condenser lens assembly, so as to illuminate the object transparency placed just beyond it, and therebeyond to enter the entrance pupil of the final 10 to 1 (or otherwise) projection lens. The transparency can thereby be illuminated by exceedingly uniform light, and an exceedingly uniform, sharp image of the circuit depicted on the transparency is formed to reduced scale on the sensitized surface beyond the reducing projection lens.

The light from the corners of the object transparency is sometimes attenuated to an undesirable degree, yielding a final projection image which is weakened in those regions. That is to say, the image is progressively weak in the radially outward direction. An important improvement provided by the invention comprises a graded neutral density filter adapted to absorb light in a graded, compensating fashion. This filter is movable throughout an adjustment range, so that an optimum position of compensation can be found.

BRIEF DESCRIPTION OF THE DRAWINGS

FIGS. 1 and 2 are vertical longitudinal medial sections through the forward and rearward halves, respectively, of an illustrative embodiment of the illuminator of the invention;

FIG. 3 is a face view of a neutral density filter used in the invention; and

FIG. 4 is a diagram showing a typical curve of light transmission across the profile of a neutral density filter.

DESCRIPTION OF AN ILLUSTRATIVE EMBODIMENT

Referring now to the drawings, which are illustrative of the broad invention, and are largely diagrammatic, the light source is a mercury arc S at one focus of an optical collector, preferably an ellipsoidal reflector R. This reflector images the arc S at its other conjugate focus, on the first of two lenticular matrixes 15 and 16 of a "fly's eye" light integrator I (previously known per se) with a magnification ratio as represented, for example, by the rays m and r, and x, y and z. The rays from the reflector form an image of the arc in the plane I' of the first lens matrix 15.

Just beyond the matrixes 15 and 16 is, preferably, a field lens 20, and immediately beyond that an aperture plate with an aperture A.

A condenser or relay lens assembly 22, 23 is situated so that its first component 22 collimates to substantial parallelism the divergent light coming through the aperture A from the secondary source (which is the arc image), and its second component 23 convergently refracts the light to enter the entrance pupil 24 of a conventionally shown objective lens P. This lens P may, for example, be a 10 to 1 reduction lens, with an entrance pupil of 0.5 inch dia.

The aperture plate A and the entrance pupil 24 of lens P are of substantially the same diameter, and the power of the condenser or "relay" lens 22,23 is such that the aperture A is imaged inside the entrance pupil 24 of the lens P.

The object 30, i.e., the transparency depicting the circuit to be printed, is located just beyond the condenser lens 22,23, and, in present practice, is square and of dimensions of 2.5 inches × 2.5 inches. A proper outside diameter for the condenser lenses is then 5 inches. The transparency 30 is illuminated by light rays whose sources are the light-filled lenticules of matrix 15, and whose projection lenses are the lenticules of matrix 16. The image F of object 30 formed by lens P is then to be reduced, for the present example, at a reduction ratio of 10 to 1 to print on a sensitized surface (not shown) at 0.25 inch × 0.25 inch.

This lens P may in practice be a corrected multiple component objective, containing a diaphragm aperture, not shown, and will have entrance and exit pupils, as usual. The drawings show the lens P entirely conventionally, and the entrance pupil is conventionally represented at 24, within the single lens element represented in the diagram, rather than in its normal position in the object space. The exit pupil is not shown. The emergent outside rays are shown to converge to the reduced image F of the object transparency 30. This will all be self-evident to those skilled in the art.

The area of optimum resolution of the entrance pupil of the lens P is its inside 50% (70% of its diameter), and for sharpest resolution the cone of entering light is preferably confined inside this inner 50%. This may be accomplished by use of an adjustable iris at aperture A, as at A', or use of an aperture A of a diameter which will result in a cone of divergent light whose area at the entrance pupil 24 of the lens P will be the inner 50% of the area of the entrance pupil.

Returning to a consideration of the illumination of the transparency 30 by the lenticules of the second matrix 16, each such lenticule, of which there may typically be about 25, is imaged by the corresponding lenticules of the first matrix 15 over the entire area of the transparency 30, so that there are 25 uniform images of 25 light sources superimposed, at very close spacing to one another, covering the area of the transparency 30. These multiple superimposed but slightly spaced images integrate so as to illuminate the transparency 30 with a very high degree of uniformity. In turn, the reduced printing image cast by the reducing objective P onto the substrate (not shown) can be highly uniform. Uniformity is further increased by the use of the field lens 20, which acts to tip the rays from matrix 15 toward the optic axis. The rays from lenticules near the periphery of the matrix are tipped more than those near the center, so as to accomplish improved superimposition at the target plane 30 of first matrix lenticule images whose object lenticules are at different distances from the optic axis.

It will of course be noted that the light rays thus formed into superimposed images by the lenticules of the first matrix 15 are refracted by the relay lens so as to converge to the object transparency 30 and on into the entrance pupil of the objective P.

A so-called hot mirror 49 placed just beyond the reflector takes out infra red radiation from the beam.

Forwardly of the aperture plate A and light integrator is a band pass filter 50, which passes the Hg h-line. Preferably a band width of 100 A is passed, centered on 4050 A. The photo resist commonly used on the photosensitive printing surface is sensitive to this band, as well known.

Finally, as a principal feature of the invention, responsible for an exceedingly high printing light uniformity at the final reduced printing plane, a graded, neutral density filter 60 is mounted about midway between the light integrator and the condenser lenses 22,23. Its mounting provides about two inches of longitudinal adjustment within the instrument. As shown, the instrument has a case 61 with a cylindrical part 62, and the frame 64 of the filter 60 is carried by a fragmentarily shown bracket 64a, equipped with screws 66 which slide in a way 67 in the part 62, with an adjustment range of about 2 inches.

The neutral density filter 60, which is a common article, is designed to attenuate light transmission, irrespective of the color or frequency of the radiation, in order to compensate for non-uniform transmission characteristics radially of the optical axis of the system.

For example, the beam emitted from the lens P may be characterized by a decrease in intensity radially from its center to its periphery, such that the corners of the sensitized surface to be printed on are insufficiently exposed. The filter is then made to be of minimum transmission at its center, say 80%, and to grade gradually up to 100% at its periphery, so as to compensate for this transmission characteristic. A suitable gradation curve is represented in FIG. 4. Optimum compensation can be found in practice by moving the filter 60 longitudinally through the adjustment range provided. Thus it will be seen that as the filter moves longitudinally, more, or less, of its graduated, partially light stopping surface is within the cone of the diverging beam. And by adjusting the filter rearwardly of the position illustrated, the denser regions of the filter move, relatively speaking, more and more radially inward into the cone, affording a substantial range of selective modification of light intensity radially of the optic axis. FIG. 4 is a diagram showing an illustrative curve of light transmission vs. the diameter of the filter. It will be seen to be a curve concave upwardly, of 100% transmission at the edges, and 80% in the center. Such a curve, and range of adjustment, enables excellent compensation in practice for variable transmission radially of the optic axis for conditions most commonly encountered.

What is claimed is:

1. In an illuminator for microphotography, the combination of:
   a primary light source in the form of an arc,
   means for collecting light from said source and directing it to a source image in a focal plane,
   optical means including a relay lens for collecting divergent light from said source image and directing it toward a focus,
   means for supporting a photographic transparency forwardly of said relay lens, to be illuminated thereby,
   a projection lens whose entrance pupil receives said directed light and which forms a real, inverted image of said transparency, to a predetermined scale, in front thereof, and
   a neutral density filter spaced between said relay lens and said source image, the transmission characteristic of said filter increasing radially outward from its center toward its periphery in a predetermined manner compensating for progressive radially outward decrease in intensity tending to occur in the divergent light between said source image and said relay lens.

2. The subject matter of claim 1, wherein said neutral density filter is arranged for adjustment movement in a longitudinal direction.

3. The subject matter of claim 2, including a fly's eye light integrator with a first lenticular matrix in said focal plane, and a second lenticular matrix just beyond said focal plane, the lenticules of said second matrix being arranged to form magnified, superimposed images of illuminated lenticules of the first matrix on said transparency on the opposite side of said relay lens.

4. The subject matter of claim 3, including an aperture plate in front of said light integrator.

5. The subject matter of claim 4, wherein said relay lens has an image to object ratio, from the aperture in said aperture plate to the entrance pupil of said projection lens, of substantially one to one.

6. The subject matter of claim 4, wherein the aperture of said aperture plate and the entrance pupil of said projection lens are of such relative size and distance ratio from said relay lens that the cone of light entering the entrance pupil of the projection lens has an area of not over 50% of said entrance pupil.

7. The subject matter of claim 4, including an adjustable iris diaphragm at said aperture in said aperture plate.

* * * * *